US008848359B1

(12) United States Patent
Lin

(10) Patent No.: US 8,848,359 B1
(45) Date of Patent: Sep. 30, 2014

(54) FIXING STRUCTURE FOR INTERFACE CARD CONNECTOR

(71) Applicant: Wistron Corp., New Taipei (TW)

(72) Inventor: Tung-Hsien Lin, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/326,511

(22) Filed: Jul. 9, 2014

Related U.S. Application Data

(62) Division of application No. 13/475,651, filed on May 18, 2012.

(30) Foreign Application Priority Data

Feb. 1, 2012 (TW) .............................. 101103280 A

(51) Int. Cl.
| | |
|---|---|
| G06F 1/16 | (2006.01) |
| H05K 7/16 | (2006.01) |
| H05K 7/02 | (2006.01) |
| H01R 13/44 | (2006.01) |

(52) U.S. Cl.
USPC ................. 361/679.32; 361/679.31; 361/727; 361/807; 361/809; 439/131

(58) Field of Classification Search
CPC ....... G06F 1/185; G06F 1/186; H05K 7/1421; G06K 13/0806; G06K 13/0831
USPC ............... 361/679.31–679.32, 724–727, 728, 361/732, 754–756, 759, 801–802, 748, 729, 361/730, 807–810; 459/159, 160, 630, 131, 459/142, 135–137, 377
See application file for complete search history.

(56) References Cited

U.S. PATENT DOCUMENTS

| | | | | |
|---|---|---|---|---|
| 5,598,319 | A * | 1/1997 | Lee ........................... | 361/679.33 |
| 6,717,817 | B2 * | 4/2004 | Liu et al. ....................... | 361/737 |
| 8,553,419 | B2 * | 10/2013 | Luo et al. ...................... | 361/727 |
| 8,591,240 | B2 * | 11/2013 | Jenks ............................. | 439/159 |
| 8,662,905 | B2 * | 3/2014 | Chang ........................... | 439/142 |
| 2009/0267677 | A1 * | 10/2009 | Myers et al. .................. | 327/356 |
| 2011/0249410 | A1 * | 10/2011 | Fujita et al. .................. | 361/748 |
| 2011/0255252 | A1 * | 10/2011 | Sloey et al. ................... | 361/752 |
| 2012/0307451 | A1 * | 12/2012 | Shukla et al. ................. | 361/699 |
| 2013/0235534 | A1 * | 9/2013 | Chang .......................... | 361/727 |

* cited by examiner

Primary Examiner — Nidhi Desai
(74) Attorney, Agent, or Firm — CKC & Partners Co., Ltd.

(57) ABSTRACT

A fixing structure for an interface card connector is provided and includes a bottom housing, a board body, an interface card connector, a fixing plate, a torsion spring, and a spring. The bottom housing has an opening and a stop wall. The interface card connector is rotatably located on the board body by a fixing axis and includes a slot. The fixing plate includes a main body, a second spring fixing portion, an interface card connector fixing portion, and a protruding portion. When the board body is moved out the opening and the protruding portion contacts the stop wall, the fixing plate is stopped, and the interface card connector is separated from the interface card connector fixing portion. As a result, the interface card connector is rotated on the board body by the torsion spring, such that the slot is directed upwardly on the board body.

6 Claims, 18 Drawing Sheets

FIXING STRUCTURE FOR INTERFACE CARD CONNECTOR

RELATED APPLICATIONS

The present application is a divisional application of U.S. application Ser. No. 13/475,651, filed on May 18, 2012, which was based on, and claims priority from, Taiwanese Patent Application Serial Number 101103280, filed Feb. 1, 2012, the disclosure of which is hereby incorporated by reference herein in its entirely.

BACKGROUND

1. Field of Invention

The present disclosure relates to a fixing structure for an interface card connector.

2. Description of Related Art

An increasing number of different types of smart cards are being used. Smart cards serve as ATM (automatic teller machine) cards, fuel cards, electronic wallet cards, etc. When it is desired to provide a portable computer with the ability to read a smart card, an interface card connector needs to be installed in the portable computer. In general, an opening is formed in a bottom housing of the portable computer and corresponds to a slot of the interface card connector. Therefore, users can insert a card body of a smart card into the slot of the interface card connector via the opening. However, a drawback of such a configuration is that an accommodating space for the card body needs to be provided in the bottom housing of the portable computer, and this is a significant use of space in the bottom housing.

SUMMARY

An aspect of the present invention is to provide a fixing structure or an interface card connector.

In an embodiment of the present invention, a fixing structure for an interface card connector includes a bottom housing, a board body, an interface card connector, a fixing plate, a torsion spring, and a spring. The bottom housing includes an opening and a stop wall. The board body is movably located on the bottom housing and corresponds in location to the opening. A protruding rib and a first spring fixing portion are formed on the board body. The interface card connector is rotatably located on the board body by a fixing axis and includes a slot. The fixing plate includes a main body, a second spring fixing portion, an interface card connector fixing portion, and a protruding portion. The main body includes a first side, a second side opposite to the first side, and a hollow portion. The hollow portion is coupled to the protruding rib, and the protruding rib is moved in the hollow portion. The second spring fixing portion is formed on the first side of the main body. The interface card connector fixing portion is formed on the first side of the main body to fix the interface card connector in such a manner that the slot faces the fixing plate. The protruding portion is formed on the second side of the main body to contact the stop wall. The torsion spring is sleeved on the fixing axis. The spring includes two end portions. The two end portions are respectively connected to the first spring fixing portion and the second spring fixing portion. When the board body is moved out the opening and the protruding portion contacts the stop wall, the fixing plate is stopped to move, and the interface card connector is separated from the interface card connector fixing portion. As a result, the interface card connector is rotated on the board body by the torsion spring, such that the slot is directed upwardly on the board body.

Another aspect of the present invention is to provide a fixing structure for interface card connector.

In an embodiment of the present invention, a fixing structure for interface card connector includes a bottom housing, an interface card connector module, and a flexible device. The bottom housing includes a bottom opening and a frame body. The frame body includes a spring opening and a hollow portion corresponding in location to the spring opening, and the hollow portion is adjacent to the bottom opening. The interface card connector module includes a board body, an interface card connector, and a first coupling portion. The board body is pivoted on the bottom housing to close the bottom opening. The interface card connector is located on the board body and includes a slot. The first coupling portion is formed on the board body or the interface card connector. The first coupling portion is adjacent to the hollow portion. The flexible device includes a fixing plate, a spring, and a second coupling portion. The fixing plate is located on the bottom housing and is adjacent to the spring opening. The spring is located in the frame body and comprises a first end and a second end. The first end is connected to the fixing plate. The second coupling portion is connected to the second end, and is coupled to the hollow portion and the first coupling portion. When the board body is pivoted on the bottom housing, the interface card connector is positioned to the second coupling portion by the first coupling portion.

Another aspect of the present invention is to provide an electronic device.

In an embodiment of the present invention, an electronic device includes one of the aforementioned fixing structures for interface card connector.

In the aforementioned embodiment of the present invention, since the interface card connector of the fixing structure can be moved from the inside of the bottom housing to the outside of the bottom housing, a card body compatible with the interface card connector can be inserted in the slot of the interface card connector outside of the bottom housing. Therefore, no limitations are placed on the length of the card body. That is, the electronic device (e.g., a portable computer) including the fixing structure does not need to provide an accommodating space for the card body, so that better space utilization of the bottom housing is made possible.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
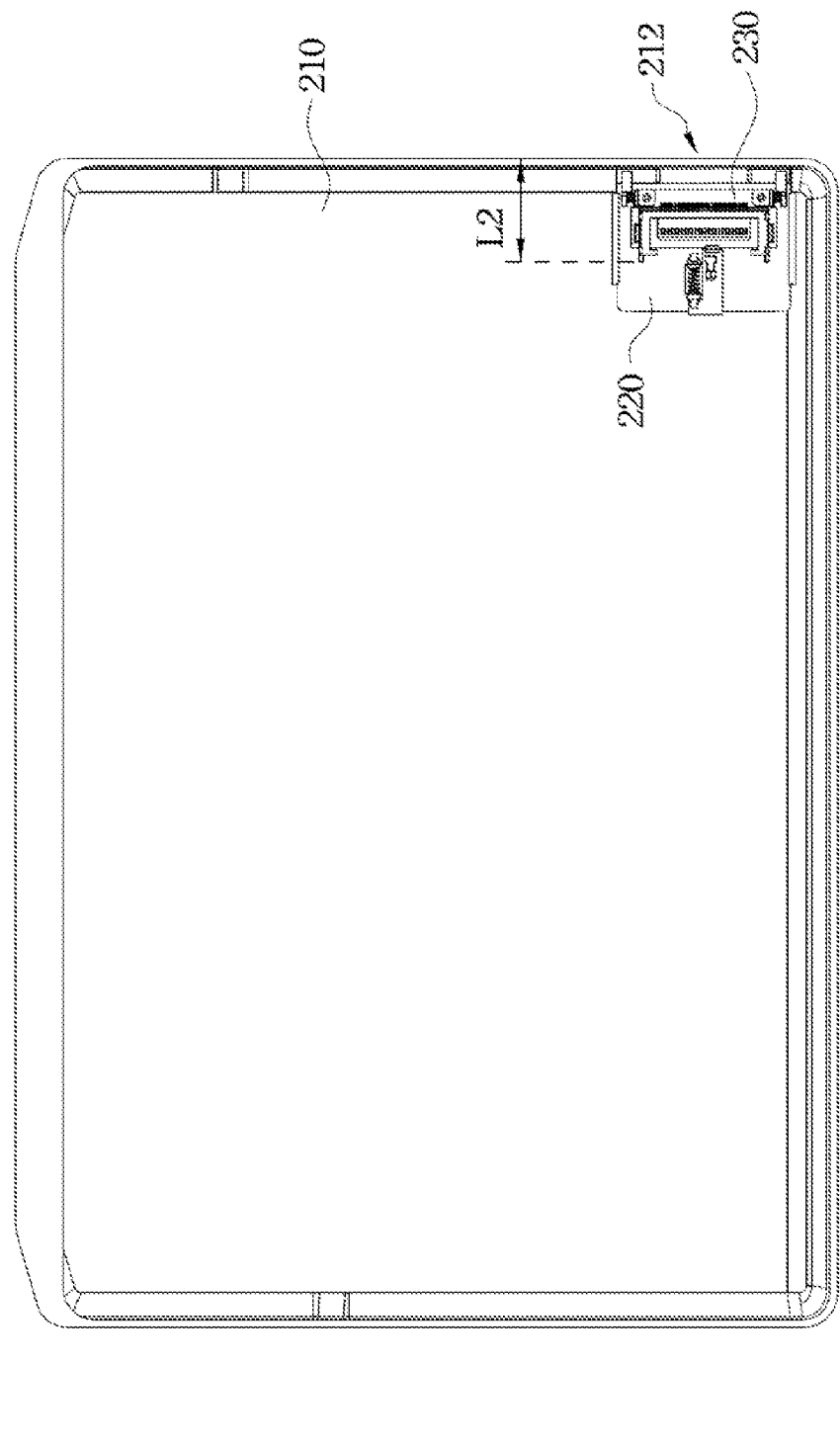
FIG. 1 is a top view of a fixing structure for an interface card connector of an embodiment of the present invention.

FIG. 1 is a top view of a fixing structure for an interface card connector 200 of an embodiment of the present invention. The fixing structure 200 can be applied to an electronic device, such as a portable computer. A bottom housing 210 includes an opening 212, and a board body 220 is movably located on the bottom housing 210 and corresponds in location to the opening 212. An interface card connector 230 is located on the board body 220. Therefore, the interface card connector 230 can be moved out of the opening 212 of the bottom housing 210. In this embodiment, the bottom housing 210 may be part of a housing of an electronic device, such as a bottom plate of a portable computer. In addition, a length L2 of the interface card connector 230 may be smaller than 35 mm.

Figure 2:
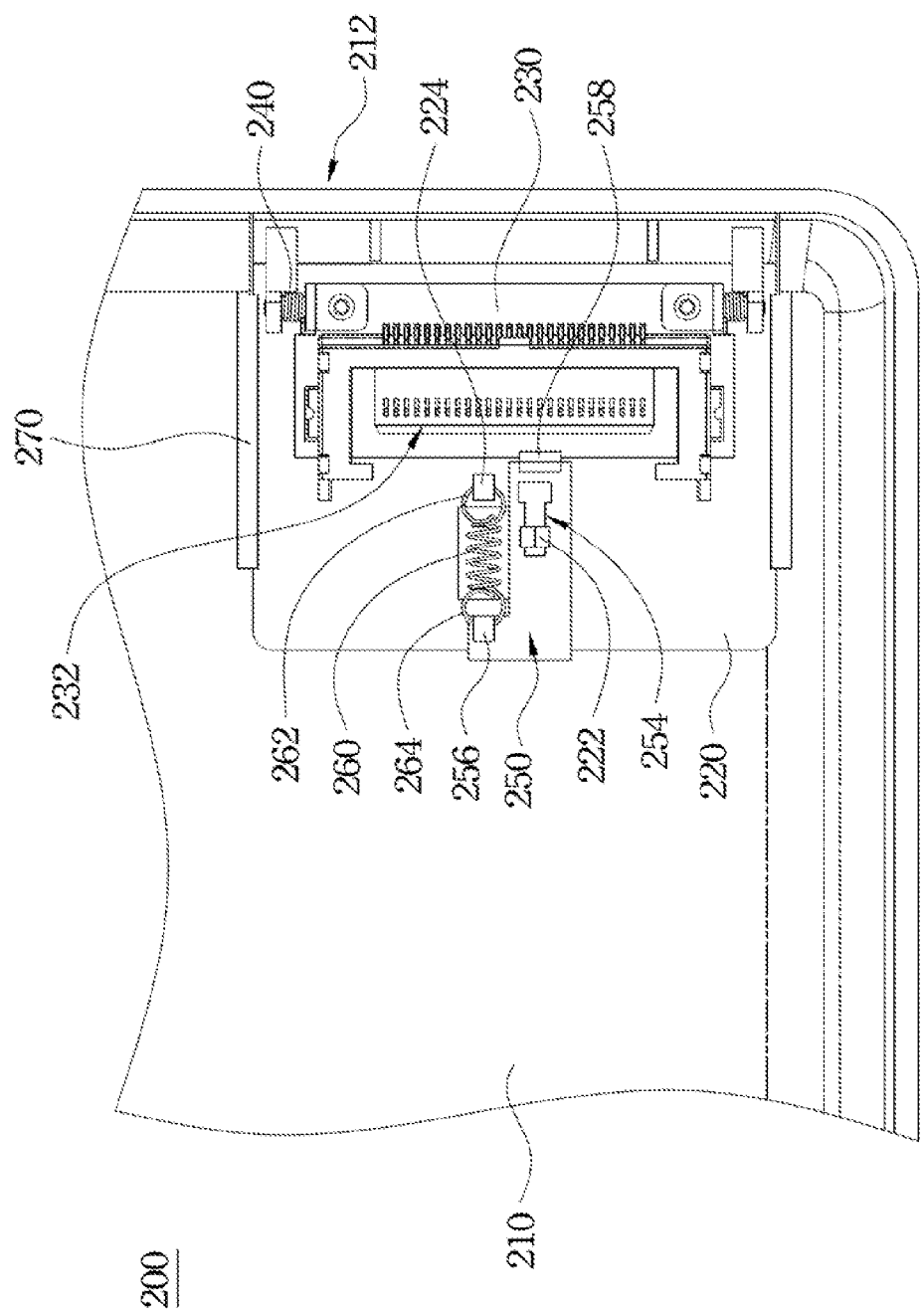
FIG. 2 is a partial enlarged view of the fixing structure shown in FIG. 1.
Figure 3:
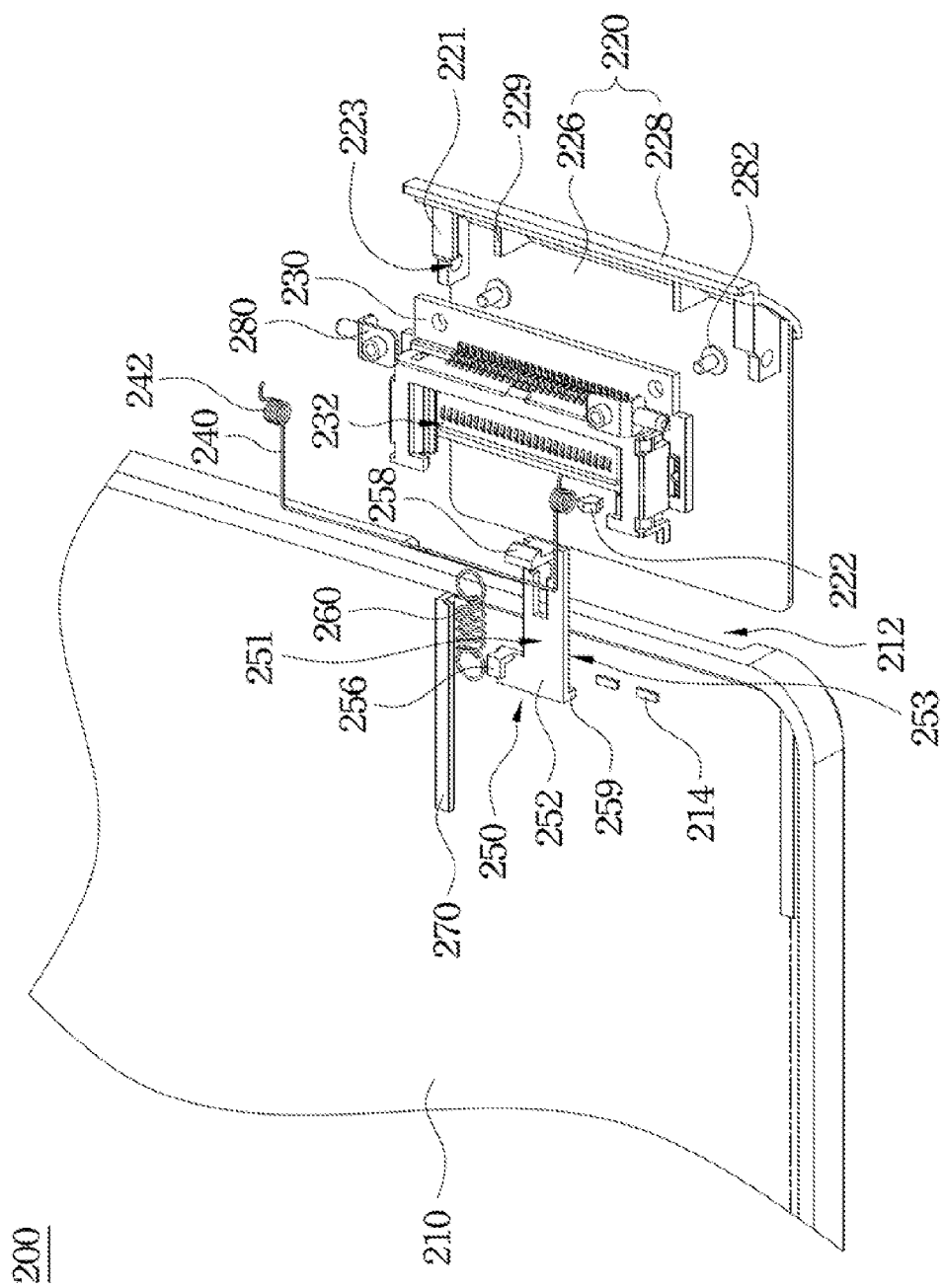
FIG. 3 is an exploded view of the fixing structure shown in FIG. 2.

FIG. 2 is a partial enlarged view of the fixing structure 200 shown in FIG. 1. FIG. 3 is an exploded view of the fixing structure 200 shown in FIG. 2. As shown in FIG. 2 and FIG. 3, the fixing structure 200 includes the bottom housing 210, the board body 220, the interface card connector 230, a fixing plate 250, a torsion spring 240, and a spring 260. The bottom housing 210 includes the opening 212 and a stop wall 214. A protruding rib 222 and a first spring fixing portion 224 are formed on the board body 220. The interface card connector 230 is rotatably located on the board body 220 by a pair of fixing axes 280 and includes a slot 232.

Moreover, the fixing plate 250 includes a main body 252, a second spring fixing portion 256, an interface card connector fixing portion 258, and a protruding portion 259. The main body 252 includes a first side 251, a second side 253 opposite to the first side 251, and a hollow portion 254. The hollow portion 254 is coupled to the protruding rib 222 in such a manner that the protruding rib 222 may be moved in the hollow portion 254. The second spring fixing portion 256 and the interface card connector fixing portion 258 are formed on the first side 251 of the main body 252. The protruding portion 259 is formed on the second side 253 of the main body 252.

Furthermore, the spring 260 includes two end portions 262, 264 connected respectively to the first spring fixing portion 224 and the second spring fixing portion 256.

In this embodiment, the fixing structure 200 includes two sliding rails 270 parallelly located on the bottom housing 210. The board body 220 includes a carrier portion 226, a door portion 228, a support portion 229, and two interface card connector supports 221. The carrier portion 226 is coupled to the two sliding rails 270. The door portion 228 stands on an edge of the carrier portion 226 to close the opening 212 of the bottom housing 210. The support portion 229 is formed on the door portion 228. In some embodiments, a pair of the support portions 229 are formed on the door portion 228. The interface card connector supports 221 stand on the carrier portion 226 and are adjacent to the door portion 228. A fixing hole 223 coupled to the fixing axis 280 is formed in the interface card connector support 221. In addition, the two fixing axes 280 shown in FIG. 3 are fixed on the interface card connector 230 respectively by two fixing elements 282. Two end portions 242 of the torsion spring 240 are respectively sleeved on the two fixing axes 280.

It is to be noted that the connection relationship of the aforementioned elements will not be repeated in the following description, and only aspects related to the use of the fixing structure will be described.

Figure 4:
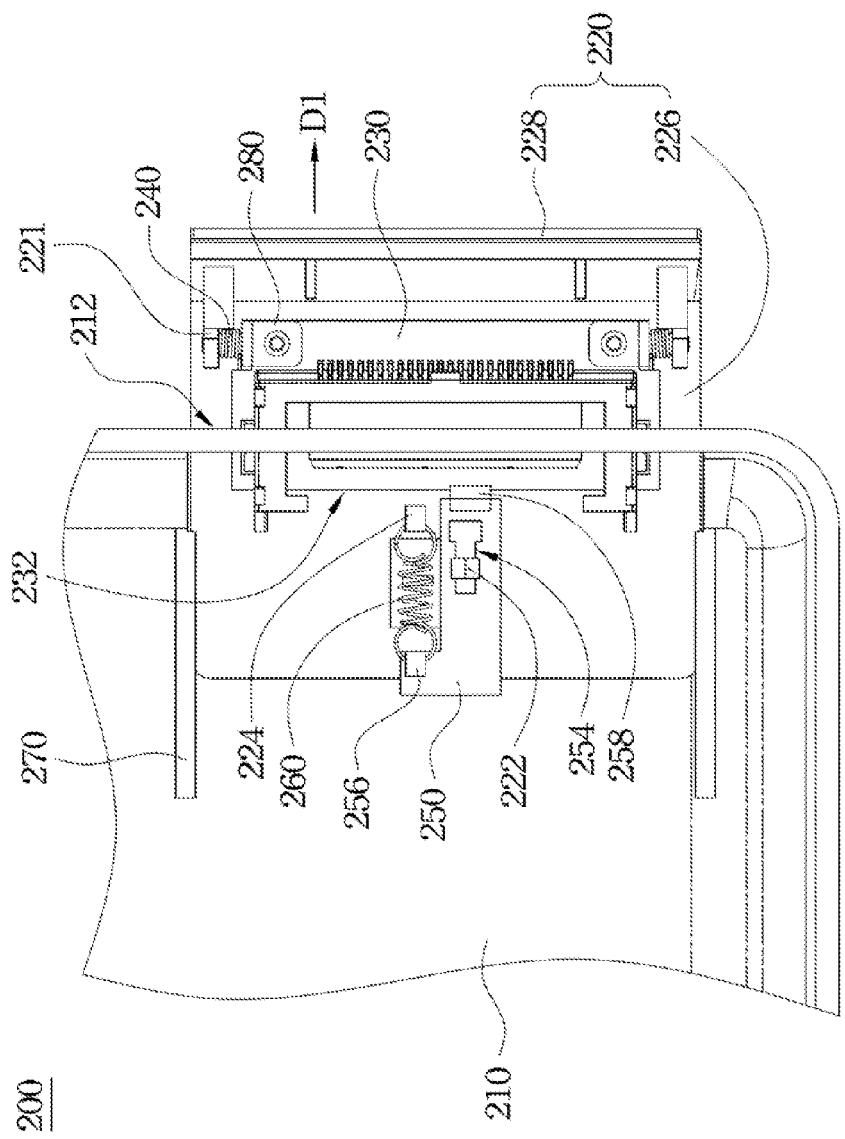
FIG. 4 is a top view of a board body when being pulled outside of an opening shown in FIG. 2.

FIG. 4 is a top view of the board body 220 when being pulled outside of the opening 212 shown in FIG. 2. The interface card connector fixing portion 258 is used to fix the interface card connector 230 in such a manner that the slot 232 faces the fixing plate 250. The protruding portion 259 is formed on the second side 253 of the main body 252 to contact the stop wall 214. Therefore, the interface card connector 230 is not rotated on the interface card connector support 221 by the spring force of the torsion spring 240. When the door portion 228 of the board body 220 is moved in a direction D1 by a force, the board body 220 can be moved in the direction D1 along the sliding rails 270 and passes through the opening 212. Since the spring 260 is connected to the first spring fixing portion 224 of the board body 220 and the second spring fixing portion 256 of the fixing plate 250, the fixing plate 250 is also moved in the direction D1.

Figure 5:
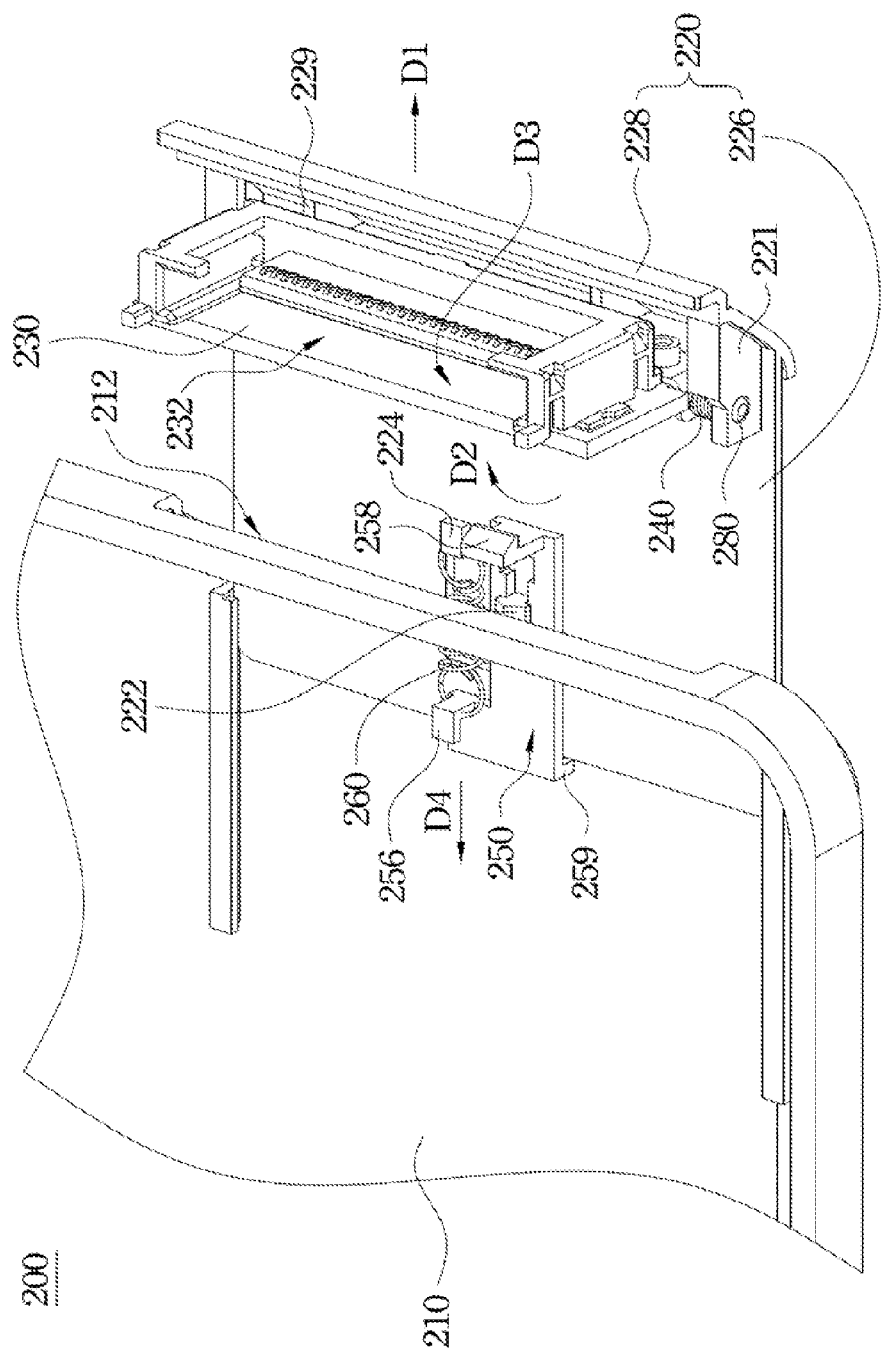
FIG. 5 is a perspective view of an interface card connector when separated from an interface card connector fixing portion shown in FIG. 4 and rotated upward.

FIG. 5 is a perspective view of the interface card connector 230 when separated from the interface card connector fixing portion 258 shown in FIG. 4 and rotated upward. As shown in FIG. 4 and FIG. 5, when the board body 220 is moved out the opening 212 in the direction D1 continuously, the protruding portion 259 of the fixing plate 250 eventually contacts the stop wall 214 (see FIG. 3), such that the fixing plate 250 is no longer able to move in the direction D1 However, the spring 260 can be stretched a distance due to its flexibility, and the protruding rib 222 of the board body 220 can be moved in the hollow portion 254 of the fixing plate 250. Consequently, when the fixing plate 250 is stopped by the stop wall 214, the board body 220 is still moved in the direction D1, assuming continuous application of the force to move the board body 220, such that the interface card connector 230 located on the board body 220 is separated from the interface card connector fixing portion 258. As a result, the interface card connector 230 is rotated on the interface card connector support 221 of the board body 220 in a direction D2 by the torsion spring 240. When the interface card connector 230 abuts the support portion 229, the interface card connector 230 is stopped to rotate. At this time, the slot 232 is directed upwardly on the board body 220.

In this embodiment, the interface card connector 230 can be pressed back to the interface card connector fixing portion 258 in a direction D3. Thereafter, the interface card connector 230 can be pushed into the bottom housing 210 through the opening 212 in a direction D4.

Figure 6:
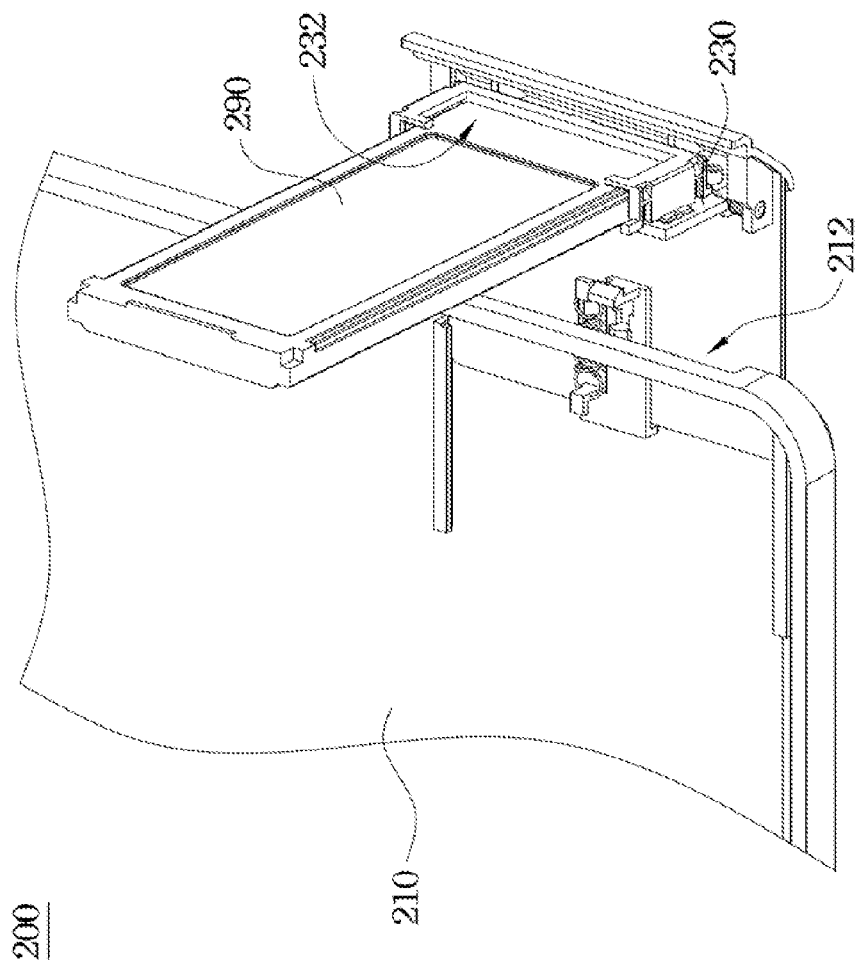
FIG. 6 is a perspective view of a slot shown in FIG. 5 when a card body is inserted thereinto.

FIG. 6 is a perspective view of the slot 232 shown in FIG. 5 when a card body 290 is inserted thereinto. It is assumed that the card body 290 is compatible with the interface card connector 230. As shown in FIG. 6, since the card body 290 can be inserted in the slot 232 of the interface card connector 230 outside of the bottom housing 210, there are no limitations placed on the size of the card body 290. That is, an electronic device (e.g., a portable computer) including the fixing structure 200 does not need to provide an accommodating space in the bottom housing 210 for the card body 290, so that better space utilization of the bottom housing 210 is made possible. It is noted that the card body 290 may be a smart card, such as an ATM card, a fuel card, an electronic wallet card, etc.

Figure 7:
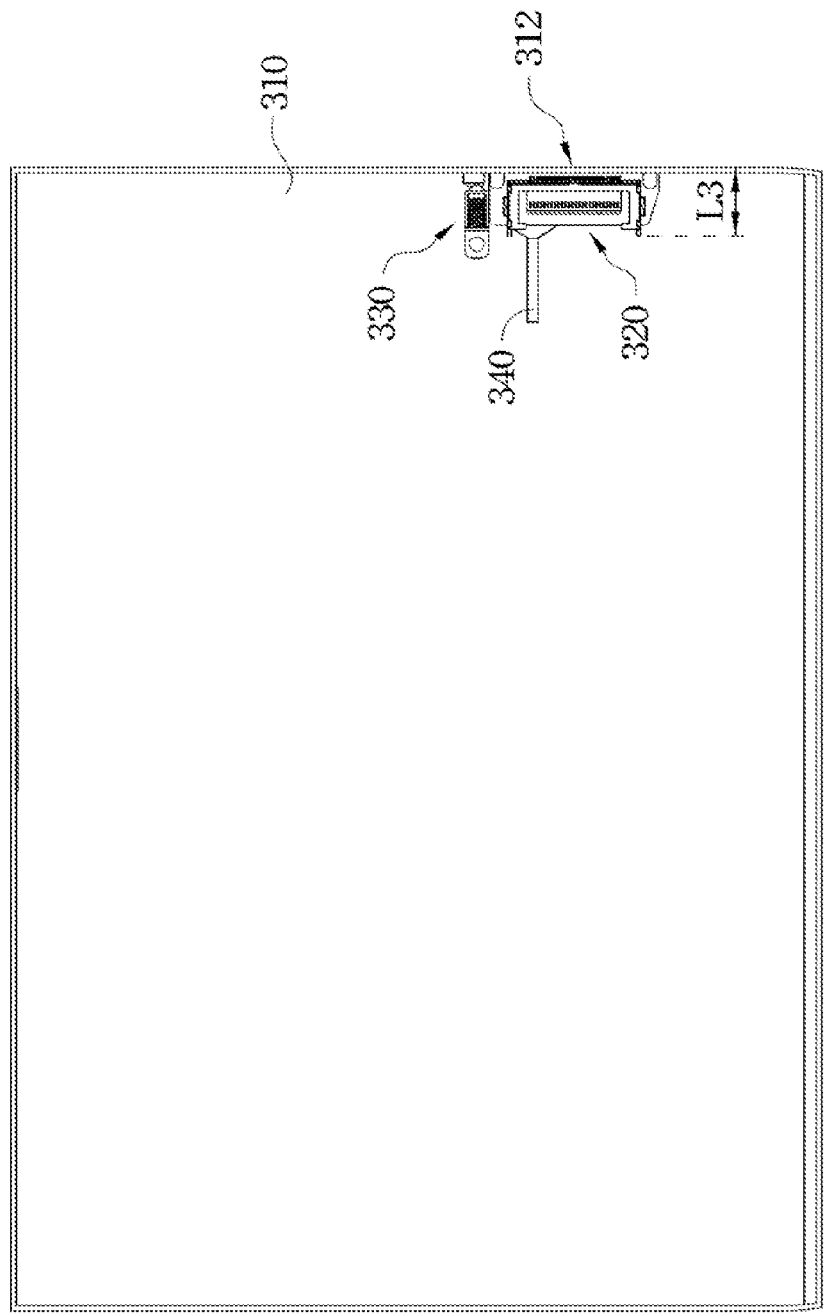
FIG. 7 is a top view of a fixing structure for an interface card connector of an embodiment of the present invention.

FIG. 7 is a top view of a fixing structure for an interface card connector 300 of an embodiment of the present invention. The fixing structure 300 can be applied to an electronic device, such as a portable computer. A bottom housing 310 includes a bottom opening 312. An interface card connector module 320 is pivoted on the bottom housing 310 and is adjacent to the bottom opening 312, such that the interface card connector module 320 can be pivoted out the bottom opening 312. In this embodiment, the bottom housing 310 may be part of a housing of an electronic device, such as a bottom plate of a portable computer. In addition, a length L3 of the interface card connector module 320 may be smaller than 20 mm.

Figure 8:
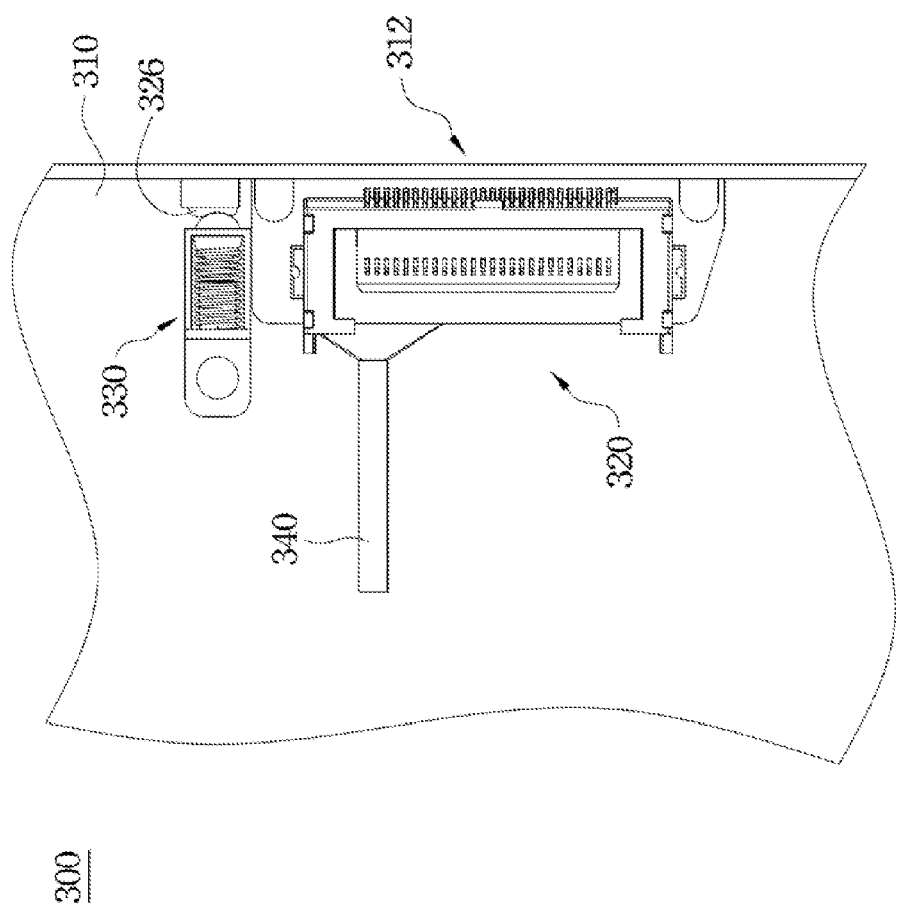
FIG. 8 is a partial enlarged view of the fixing structure shown in FIG. 7.
Figure 9:
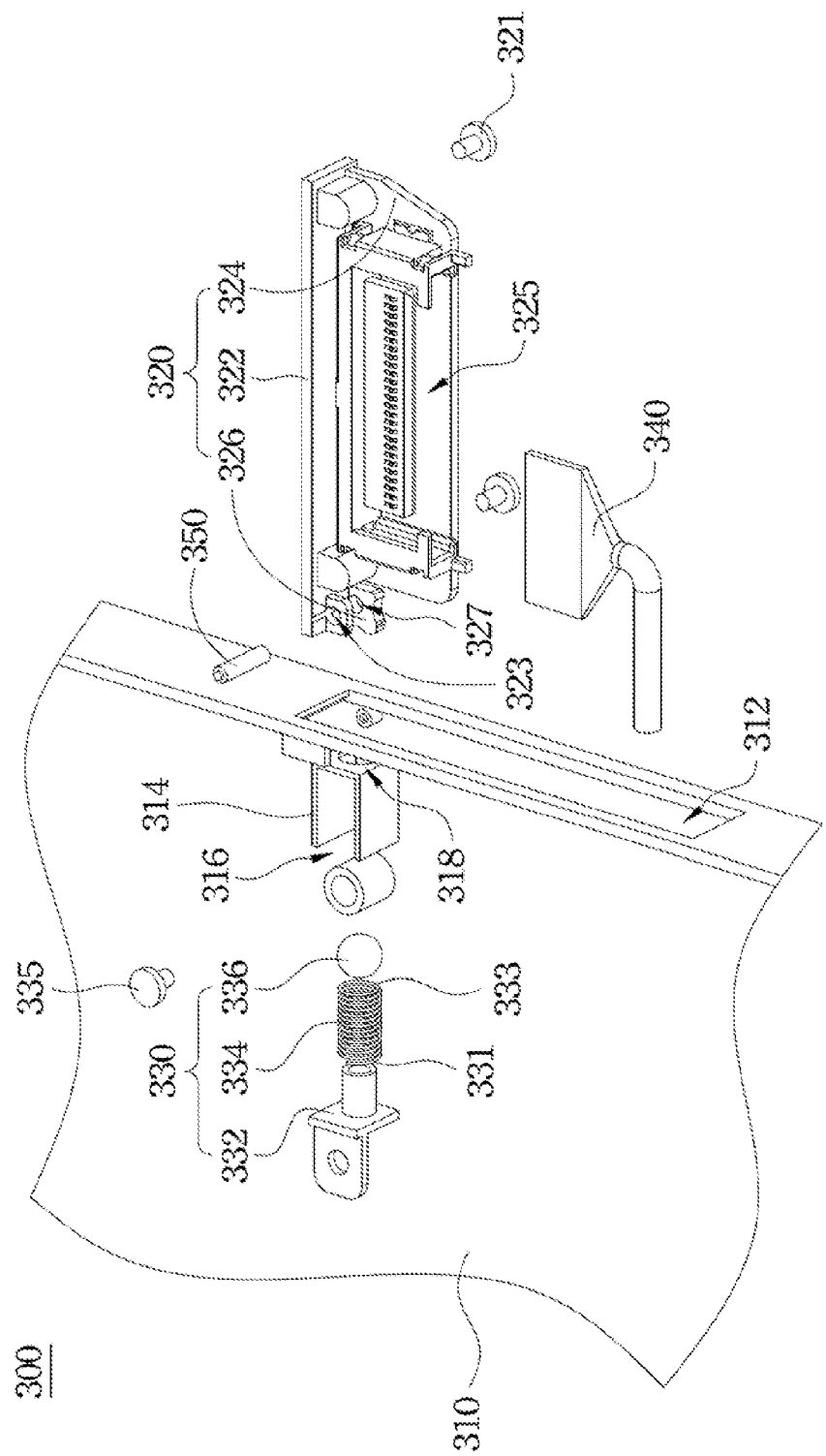
FIG. 9 is an exploded view of the fixing structure shown in FIG. 8.

FIG. 8 is a partial enlarged view of the fixing structure 300 shown in FIG. 7. FIG. 9 is an exploded view of the fixing structure 300 shown in FIG. 8. As shown in FIG. 8 and FIG. 9, the fixing structure 300 includes the bottom housing 310, the interface card connector module 320, and a flexible device 330. The bottom housing 310 includes the bottom opening 312 and a frame body 314. Furthermore, the frame body 314 includes a spring opening 316 and a hollow portion 318 corresponding to the spring opening 316. The hollow portion 318 is adjacent to the bottom opening 312.

The interface card connector module 320 includes a board body 322, an interface card connector 324, and a first coupling portion 326. The board body 322 is pivoted on the bottom housing 310 to close the bottom opening 312. The interface card connector 324 is fixed on the board body 322 by a fixing element 321 and is substantially perpendicular to the board body 322. Furthermore, the interface card connector 324 includes a slot 325. The first coupling portion 326 is formed on the board body 322 and is adjacent to the hollow portion 318.

The flexible device 330 includes a fixing plate 332, a spring 334, and a second coupling portion 336. The fixing plate 332 is located on the bottom housing 310 and is adjacent to the spring opening 316. The fixing plate 332 may be fixed on the bottom housing 310 by a fixing element 335. In this embodiment, the shape of the frame body 314 may be U-shaped. The spring 334 is located in the frame body 314 and includes a first end 331 and a second end 333. The first end 331 is connected to the fixing plate 332. The second coupling portion 336 is connected to the second end 333, and is coupled to the hollow portion 318 and the first coupling portion 326. As a result, the second coupling portion 336 can contact the first coupling portion 326 through the hollow portion 318.

Moreover, the fixing structure 300 further includes a transmission line 340 electrically connected to the interface card connector 324, such that the interface card connector 324 can transmit data to other devices (not shown) located on the bottom housing 310. In this embodiment, a first pivoting hole 323 is formed in the board body 322, and a second pivoting hole 327 is formed in the first coupling portion 326 and aligned with the first pivoting hole 323. In addition, the fixing structure 300 further includes a pivot 350 that extends through the first pivoting hole 323 and the second pivoting hole 327, such that the first coupling portion 326 can be pivoted with the board body 322.

Figure 10:
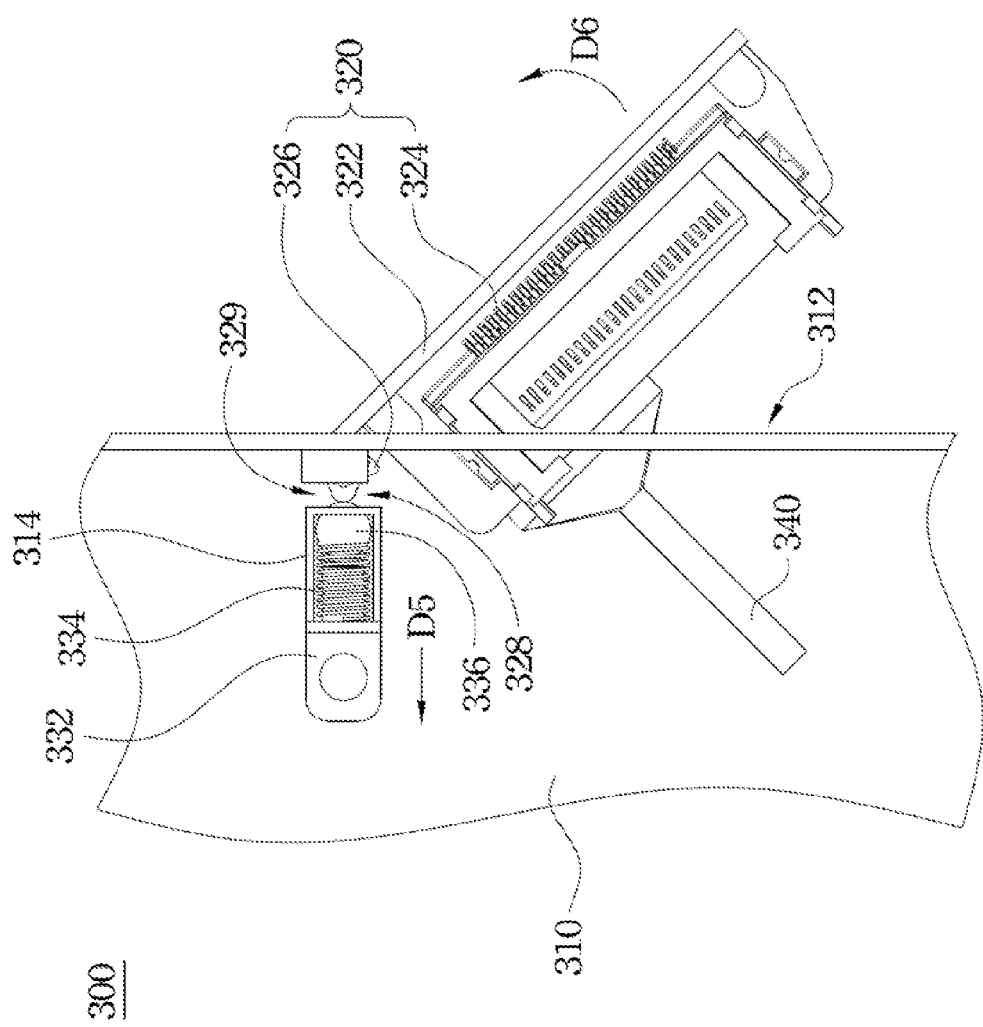
FIG. 10 is a top view of a board body when being pulled outside of a bottom opening shown in FIG. 8.

FIG. 10 is top view of the board body 322 when being pulled outside of the bottom opening 312 shown in FIG. 8. As shown in FIG. 10, the first coupling portion 326 includes a first concave portion 328 and a second concave portion 329 adjacent to the first concave portion 328, and the second coupling portion 336 is optionally coupled to the first concave portion 328 or the second concave portion 329. When the first concave portion 328 is coupled to the second coupling portion 336, the bottom opening 312 is closed by the board body 322. When the board body 322 is pivoted on the bottom housing 310 in a direction D6, the first coupling portion 326 is rotated with the board body 322. Consequently, the spring 334 is compressed by the first coupling portion 326, such that the second coupling portion 336 is separated from the first concave portion 328 in a direction D5.

Figure 11:
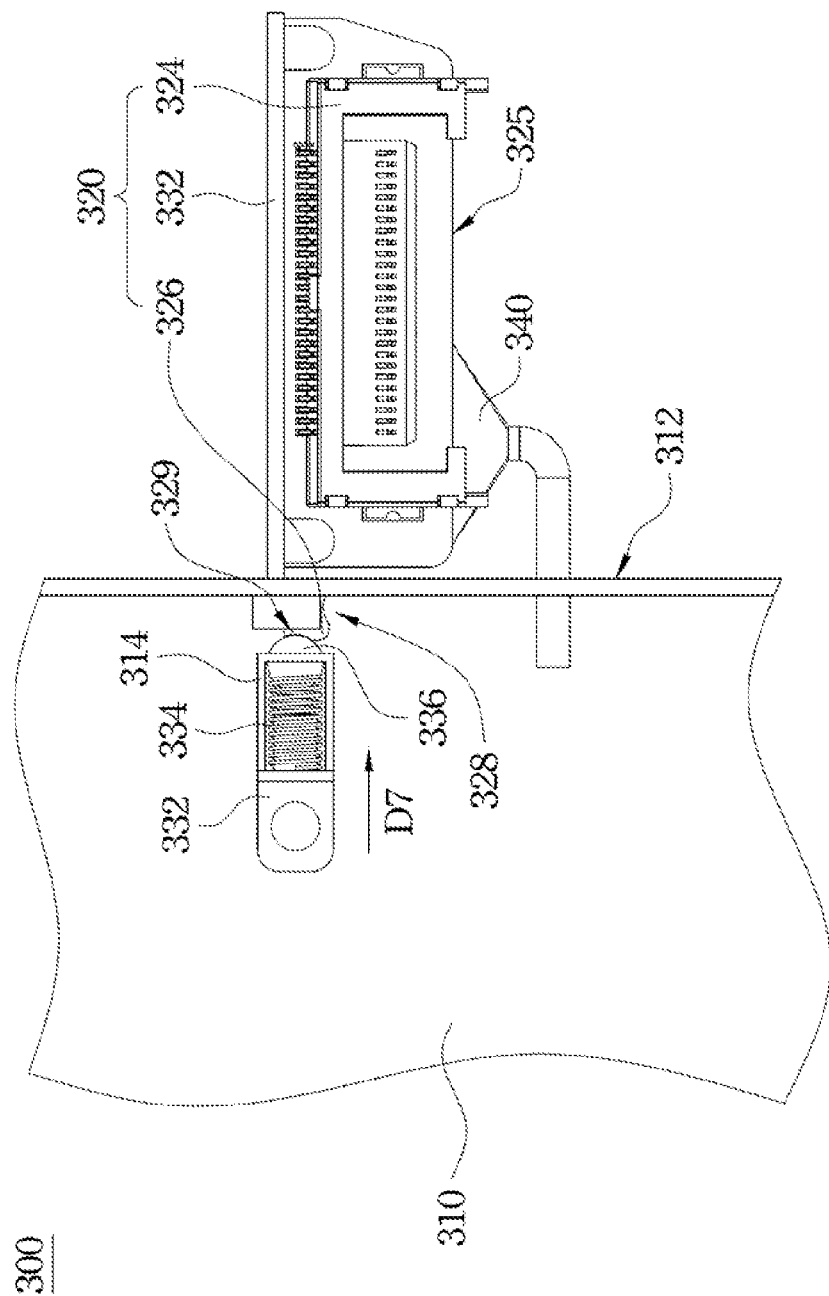
FIG. 11 is a top view of a second concave portion when coupled to a second coupling portion shown in FIG. 10.

FIG. 11 is a top view of the second concave portion 329 when coupled to the second coupling portion 336 shown in FIG. 10. When the second concave portion 329 is coupled to the second coupling portion 336, the board body 322 is substantially perpendicular to the bottom opening 312. At this time, the board body 322 is positioned by the second coupling portion 336 due to the biasing force in a direction D7 of the spring 334. As shown in FIG. 10 and FIG. 11, when the board body 322 is pivoted on the bottom housing 310, the interface card connector module 320 can be positioned to the second coupling portion 336 by the first concave portion 328 or the second concave portion 329 of the first coupling portion 326.

Figure 12:
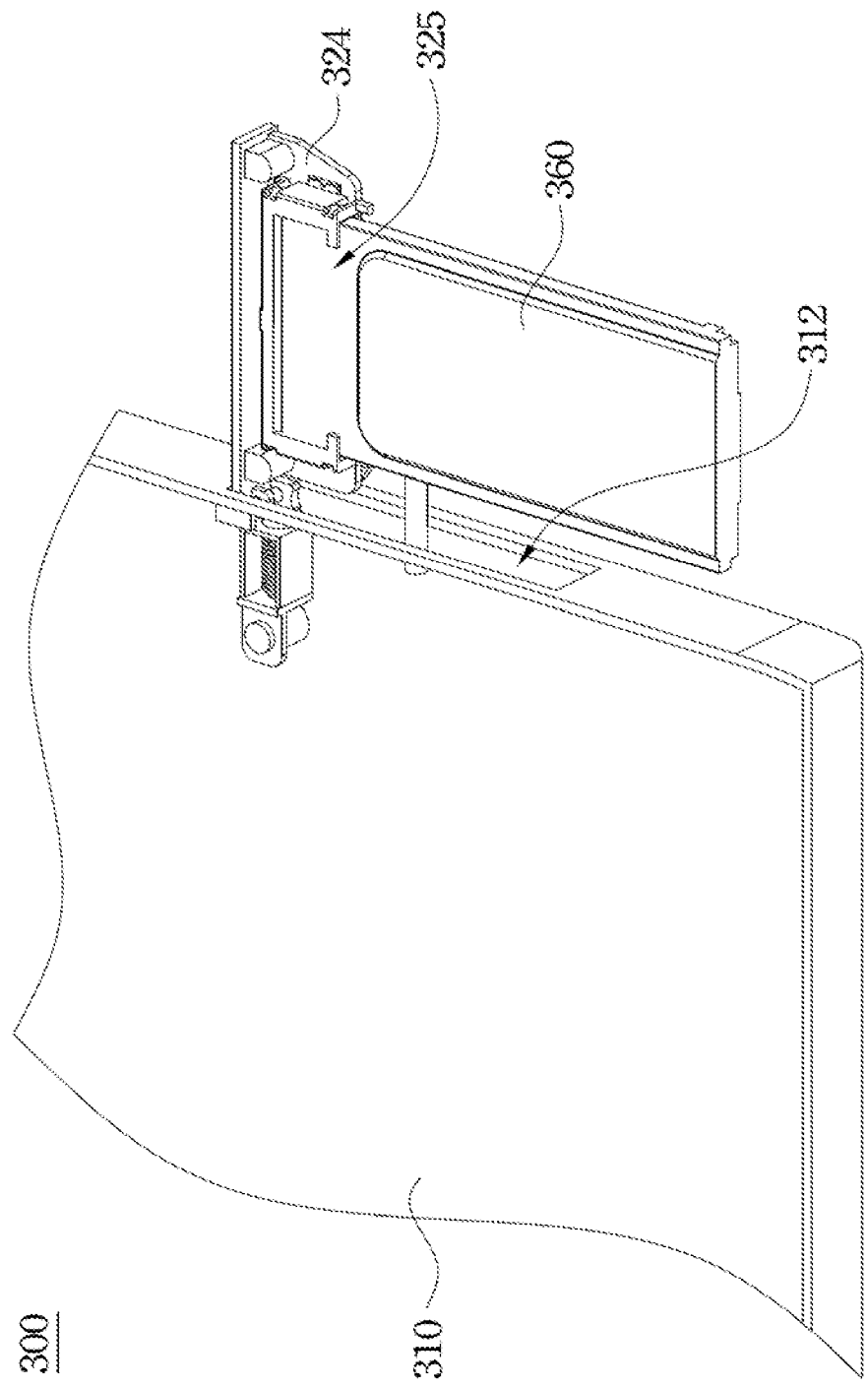
FIG. 12 is a perspective view of a slot shown in FIG. 11 when a card body is inserted thereinto.

FIG. 12 is a perspective view of the slot 325 shown in FIG. 11 when a card body 360 is inserted thereinto. Since the card body 360, which is compatible with the interface card connector 324, can be inserted in the slot 325 of the interface card connector 324 outside of the bottom housing 310, there are no limitations placed on the size of the card body 360. Hence, better space utilization of the bottom housing 310 is made possible.

Figure 13:
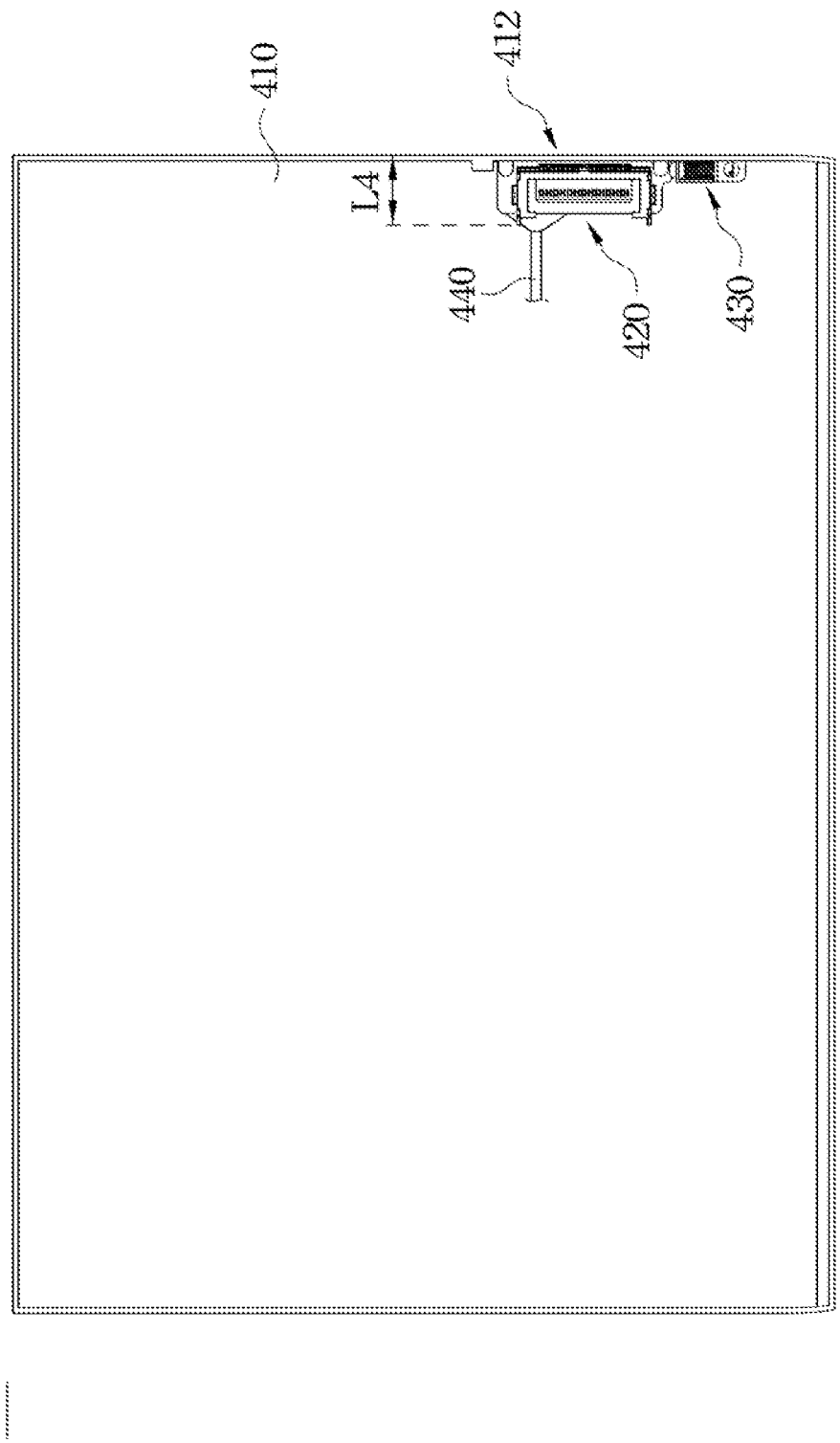
FIG. 13 is a top view of a fixing structure for an interface card connector of an embodiment of the present invention.

FIG. 13 is a top view of a fixing structure for an interface card connector 400 of an embodiment of the present invention. The fixing structure 400 can be applied to an electronic device, such as a portable computer. A bottom housing 410 includes a bottom opening 412. An interface card connector module 420 is pivoted on the bottom housing 410 and adjacent to the bottom opening 412, such that the interface card connector module 420 can be pivoted out the bottom opening 412. In this embodiment, the bottom housing 410 may be a housing of an electronic device, such as a bottom plate of a portable computer. In addition, a length L4 of the interlace card connector module 420 may be smaller than 20 mm.

Figure 14:
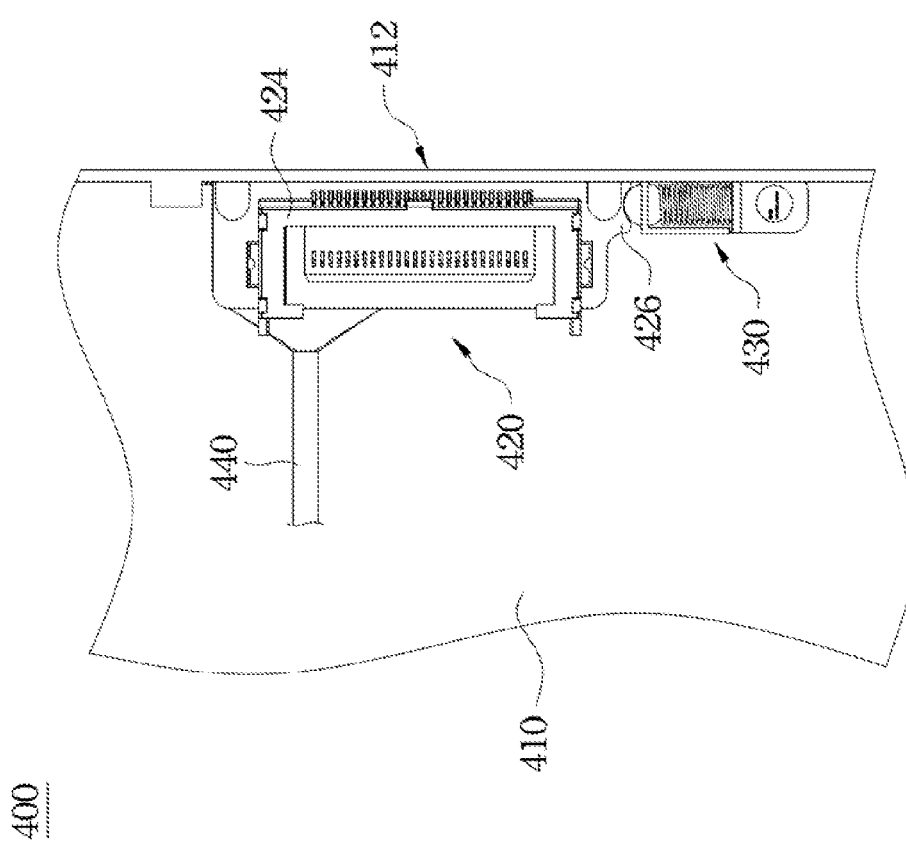
FIG. 14 is a partial enlarged view of the fixing structure shown in FIG. 13.
Figure 15:
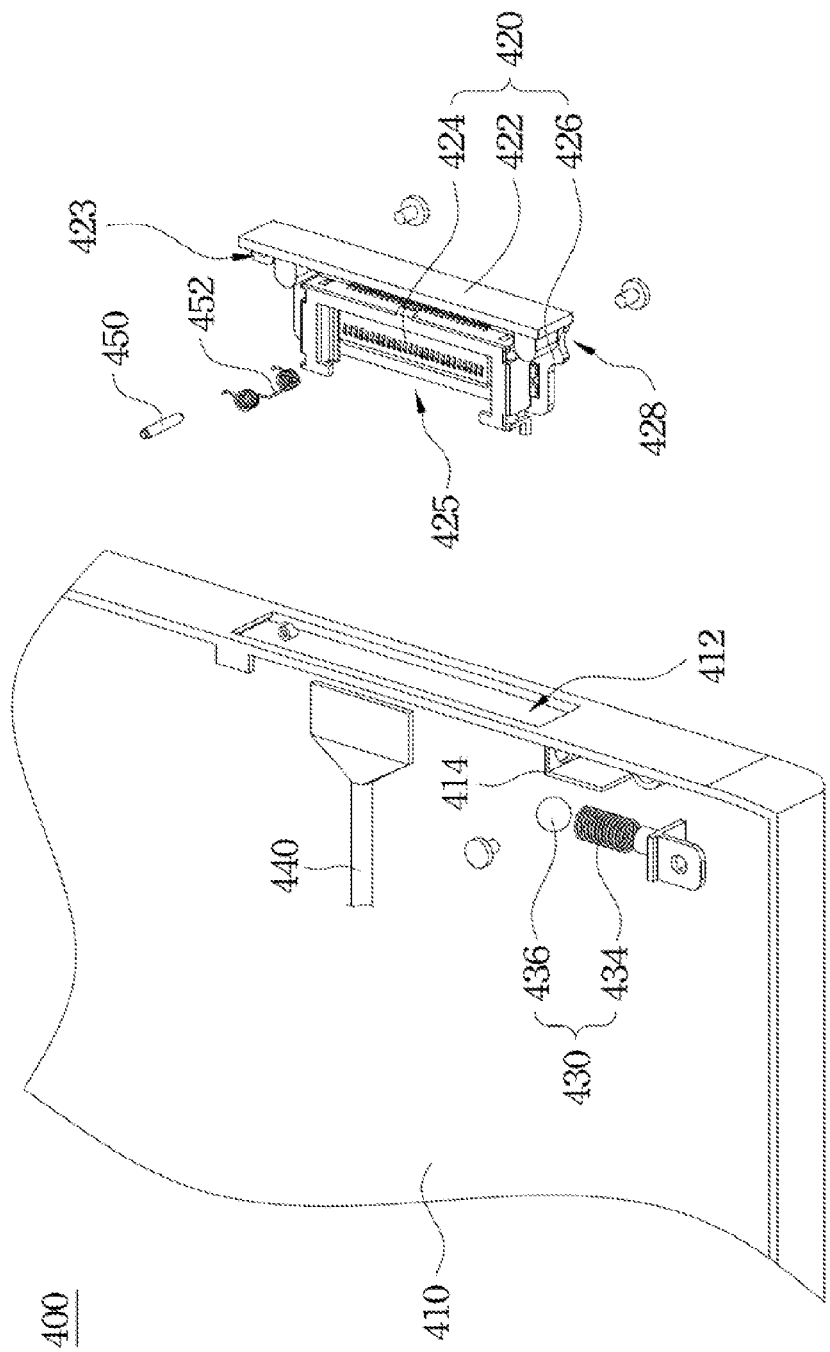
FIG. 15 is an exploded view of the fixing structure shown in FIG. 14.

FIG. 14 is a partial enlarged view of the fixing structure 400 shown in FIG. 13. FIG. 15 is an exploded view of the fixing structure 400 shown in FIG. 14. As shown in FIG. 14 and FIG. 15, the fixing structure 400 includes the bottom housing 410, the interface card connector module 420, and a flexible device 430. The differences between this embodiment and the aforementioned embodiments is that a first coupling portion 426 is formed on an interface card connector 424, and a pivoting hole 423 is formed in a board body 422. Furthermore, the fixing structure 400 includes a pivot 450 and a torsion spring 452 sleeved on the pivot 450. The pivot 450 is inserted into the pivoting hole 423, such that the first coupling portion 426 of the interface card connector 424 can be pivoted with the board body 422. In addition, the frame body 414 may be L-shaped, and the bottom housing 410 limits the position of a spring 434 by the frame body 414.

In this embodiment, the first coupling portion 426 includes a single concave portion 428 capable of coupling to a second coupling portion 436. When the concave portion 428 is coupled to the second coupling portion 436, the bottom opening 412 is closed by the board body 422.

Figure 16:
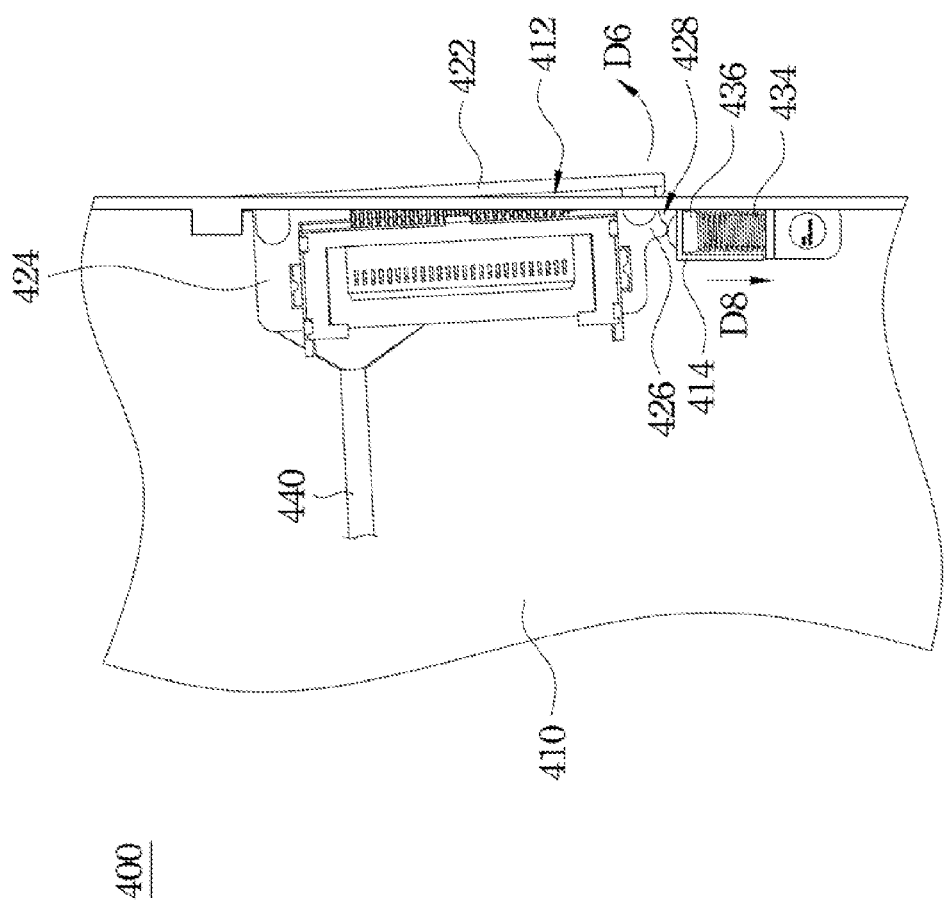
FIG. 16 is a top view of a board body when being pulled outside of a bottom opening shown in FIG. 15.
Figure 17:
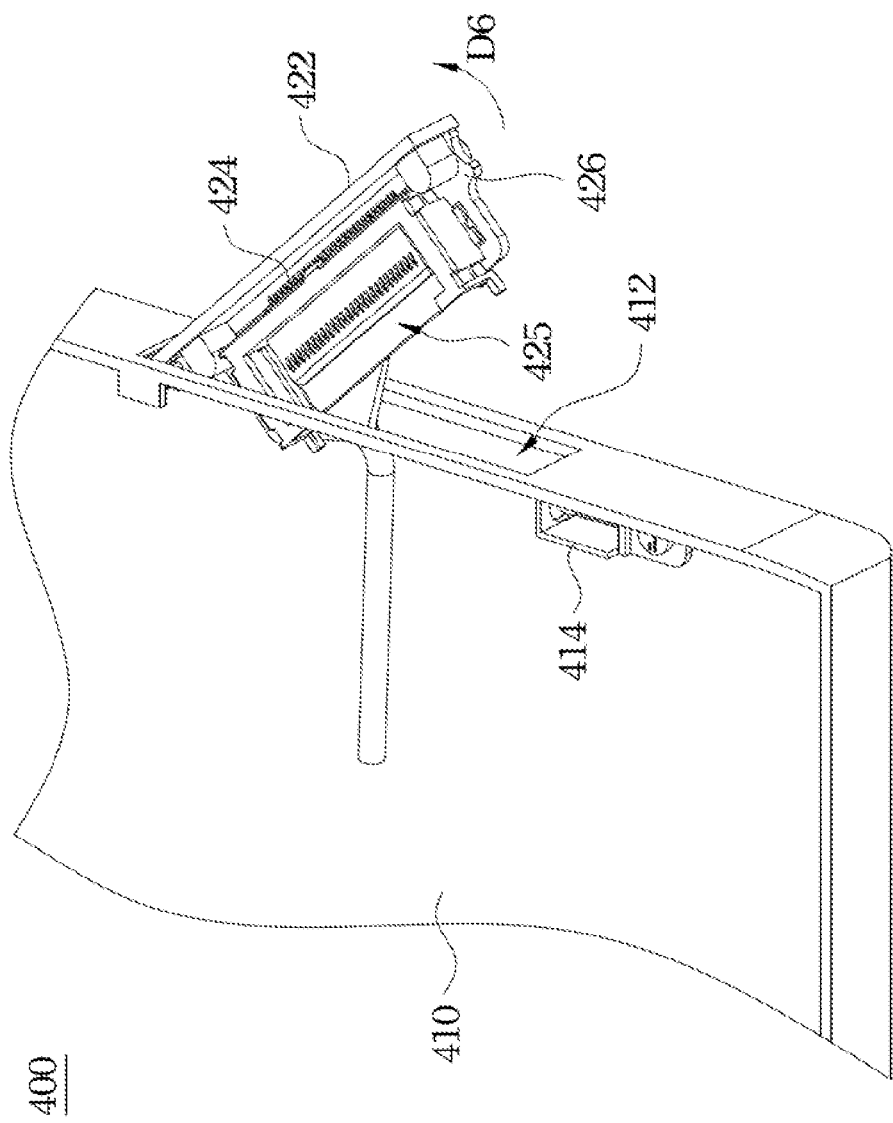
FIG. 17 is a perspective view of a first coupling portion when separated from a second coupling portion shown in FIG. 16.

FIG. 16 is a top view of the board body 422 when being pulled outside of the bottom opening 412 shown in FIG. 15. FIG. 17 is a perspective view of the first coupling portion 426 when separated from the second coupling portion 436 shown in FIG. 16. As shown in FIG. 16 and FIG. 17, when the board body 422 is pulled outside of the bottom opening 412 in the direction D6, the spring 434 is compressed by the first coupling portion 426 in a direction D8, and the first coupling portion 426 is separated from the second coupling portion 436. At this time, the board body 422 can be moved in the direction D6 by the torsion spring 452 (see FIG. 15) until eventually, the board body 422 is substantially perpendicular to the bottom opening 412.

Figure 18:
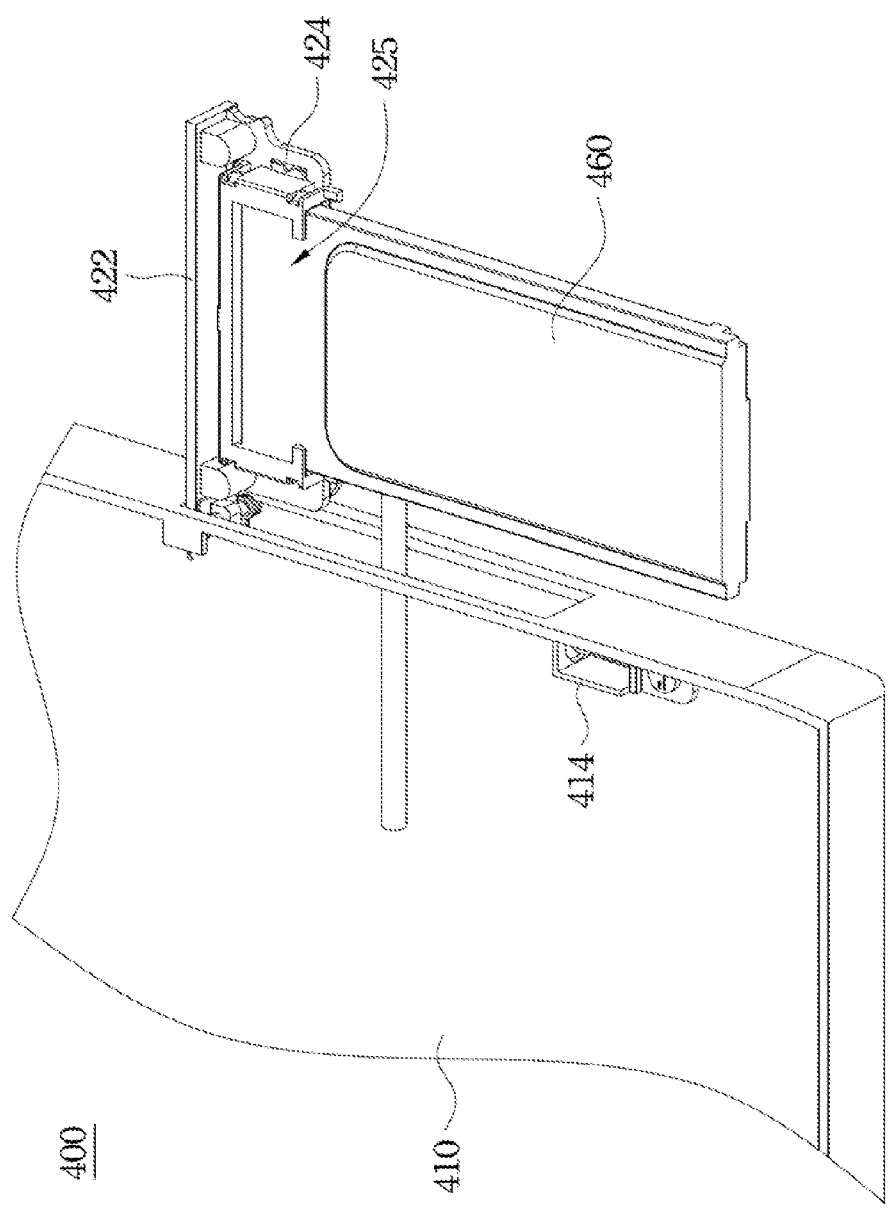
FIG. 18 is a perspective view of a slot shown in FIG. 17 when a card body is inserted thereinto.

FIG. 18 is a perspective view of a slot 425 shown in FIG. 17 when a card body 460 is inserted thereinto. Since the card body 460, which is compatible with the interface card connector 424, can be inserted in the slot 425 of the interface card connector 424 outside of the bottom housing 410, there are no limitations placed on the size of the card body 460. Hence, better space utilization of the bottom housing 410 is made possible.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A fixing structure for an interface card connector comprising: a bottom housing having an opening and a stop wall; a board body movably disposed on the bottom housing and corresponding in location to the opening, wherein a protruding rib and a first spring fixing portion are formed on the board body; the interface card connector rotatably disposed on the board body by a fixing axis, wherein the interface card connector comprises a slot; a fixing plate comprising: a main body comprising a first side, a second side opposite to the first side, and a hollow portion, wherein the hollow portion is coupled to the protruding rib, and the protruding rib is moved in the hollow portion; a second spring fixing portion formed on the first side of the main body; an interface card connector fixing portion formed on the first side of the main body for fixing the interface card connector in such a manner that the slot faces the fixing plate; and a protruding portion formed on the second side of the main body for contacting the stop wall; a torsion spring sleeved on the fixing axis; and a spring comprising two end portions, wherein the two end portions are respectively connected to the first spring fixing portion and the second spring fixing portion, when the board body is moved out of the opening and the protruding portion contacts the stop wall, the fixing plate is stopped to move, and the interface card connector is separated from the interface card connector fixing portion and is rotated on the board body by the torsion spring, such that the slot is directed upwardly on the board body.

2. The fixing structure as claimed in claim 1, further comprising:
two sliding rails parallelly located on the bottom housing.

3. The fixing structure as claimed in claim 2, wherein the board body comprises:
a carrier portion coupled to the two sliding rails; and
a door portion standing on an edge of the carrier portion for closing the opening of the bottom housing.

4. The fixing structure as claimed in claim 3, wherein the board body further comprises:
a support portion formed on the door portion for supporting the interface card connector.

5. The fixing structure as claimed in claim 3, wherein the board body further comprises:
an interface card connector support standing on the carrier portion and adjacent to the door portion, wherein a fixing hole coupled to the fixing axis is formed in the interface card connector support.

6. An electronic device comprising: a fixing structure for an interface card connector comprising: a bottom housing having an opening and a stop wall; a board body movably disposed on the bottom housing and corresponding in location to the opening, wherein a protruding rib and a first spring fixing portion are formed on the board body; the interface card connector rotatably disposed on the board body by a fixing axis, wherein the interface card connector comprises a slot; a fixing plate comprising: a main body having a first side, a second side opposite to the first side, and a hollow portion, wherein the hollow portion is coupled to the protruding rib, and the protruding rib is moved in the hollow portion: a second spring fixing portion formed on the first side of the main body; an interface card connector fixing portion formed on the first side of the main body for fixing the interface card connector in such a manner that the slot faces the fixing plate; and a protruding portion formed on the second side of the main body for contacting the stop wall; a torsion spring sleeved on the fixing axis; and a spring comprising two end portions, wherein the two end portions are respectively connected to the first spring fixing portion and the second spring fixing portion, when the board body is moved out of the opening and the protruding portion contacts the stop wall, the fixing plate is stopped to move, and the interface card connector is separated from the interface card connector fixing portion and is rotated on the board body by the torsion spring, such that the slot is directed upwardly on the board body.

* * * * *